US009862335B2

(12) United States Patent
Vu

(10) Patent No.: US 9,862,335 B2
(45) Date of Patent: Jan. 9, 2018

(54) VEHICLE CARGO BED STRUCTURE

(71) Applicant: Nissan North America, Inc., Franklin, TN (US)

(72) Inventor: Long Ngoc Vu, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/054,858

(22) Filed: Feb. 26, 2016

(65) Prior Publication Data

US 2017/0246996 A1 Aug. 31, 2017

(51) Int. Cl.

| | |
|---|---|
| ***B60R 13/06*** | (2006.01) |
| ***B62D 33/027*** | (2006.01) |
| ***B62D 33/03*** | (2006.01) |
| ***B60R 13/01*** | (2006.01) |
| ***B60P 7/08*** | (2006.01) |

(52) U.S. Cl.

CPC ............ *B60R 13/06* (2013.01); *B60P 7/0815* (2013.01); *B60R 13/01* (2013.01); *B62D 33/0273* (2013.01); *B62D 33/03* (2013.01); *B60R 2013/016* (2013.01)

(58) Field of Classification Search

CPC ... B60R 13/06; B60R 13/01; B60R 2013/016; B60P 7/0815; B62D 33/03; B62D 33/0273

USPC .......................................................... 296/57.1

See application file for complete search history.

(56) References Cited

U.S. PATENT DOCUMENTS

| | | | |
|---|---|---|---|
| 3,004,678 | A | 10/1961 | Golaski |
| 4,131,378 | A | 12/1978 | Daws |
| 4,763,945 | A | 8/1988 | Murray |
| 5,188,415 | A | 2/1993 | Wagner |
| 5,516,185 | A | 5/1996 | O'Donnell et al. |
| D374,854 | S | 10/1996 | Little et al. |
| 5,664,822 | A | 9/1997 | Rosenfield |
| 5,904,391 | A | 5/1999 | Liljenquest et al. |
| 6,293,602 | B1 | 9/2001 | Presley |
| 6,540,278 | B2 | 4/2003 | Presley |
| D488,115 | S | 4/2004 | Trunk et al. |
| 6,846,140 | B2 | 1/2005 | Anderson et al. |
| 7,214,018 | B2 | 5/2007 | Lussier |
| 7,594,787 | B2 | 9/2009 | Womack et al. |
| 7,819,295 | B2 | 10/2010 | Plavetich |
| 9,014,764 | B2 | 4/2015 | Johnson et al. |

(Continued)

*Primary Examiner* — Joseph D. Pape
*Assistant Examiner* — Dana D Ivey
(74) *Attorney, Agent, or Firm* — Global IP Counselors, LLP

(57) ABSTRACT

A vehicle cargo bed structure includes a bed floor with an accessory attachment track, a tailgate and a tailgate gap cover. The tailgate gap cover has an attachment structure that includes a first part and a second part. The first part is inserted into a channel between side walls of the accessory attachment track. The second part is positioned above the side walls of the accessory attachment track with a fastening member extending between the first part and the second part clamping the attachment structure to the accessory attachment track. The tailgate gap cover is removable and re-attachable to the accessory attachment track. The tailgate gap cover is pivotal between a horizontal orientation with an adjacent tailgate in an open position and an upright orientation with the tailgate in the closed position.

15 Claims, 11 Drawing Sheets

(56) References Cited

U.S. PATENT DOCUMENTS

| | | | | |
|---|---|---|---|---|
| 2008/0219795 | A1 | 9/2008 | Anderson et al. | |
| 2008/0298923 | A1 | 12/2008 | Kovie | |
| 2012/0159857 | A1* | 6/2012 | Kaplan .............. | B62D 33/0273 49/465 |
| 2012/0222357 | A1 | 9/2012 | Elliott et al. | |
| 2012/0223541 | A1* | 9/2012 | Gianino ............. | B62D 33/0273 296/57.1 |

* cited by examiner

VEHICLE CARGO BED STRUCTURE

BACKGROUND

Field of the Invention

The present invention generally relates to a vehicle cargo bed structure and accessory. More specifically, the present invention relates to a vehicle cargo bed structure and accessory where the tailgate accessory covers a gap between the cargo bed and a tailgate.

Background Information

A vehicle such as a pick-up truck typically includes a cargo bed and a tailgate that pivotally moves between an upright closed position and an inclined open position. In order for the tailgate to move between the open position and the closed position, a pivoting end of the tailgate is slightly spaced apart from an adjacent end of the cargo bed. Consequently a gap is defined between the pivoting end of the tailgate and the adjacent end of the cargo bed. When the cargo bed is used to haul small material, such as gravel, stone or dirt, this small material can become lodged in the gap between the tailgate and the cargo bed.

SUMMARY

One object of the disclosure is to provide a vehicle cargo bed having a tailgate with a tailgate gap cover that is easily installed to the vehicle cargo bed and that can move between an upright position and a horizontal position with movement of the tailgate in order to cover a gap between the cargo bed and the tailgate.

In view of the state of the known technology, one aspect of the present disclosure is to provide a vehicle cargo bed structure with a vehicle cargo area, an accessory attachment track, a tailgate and a tailgate gap cover. The vehicle cargo area includes a bed floor, a first side cargo wall and a second side cargo wall. A tailgate opening is defined at rearward ends of the first and second cargo walls. The accessory attachment track is attached to the bed floor. The accessory attachment track extends in a vehicle longitudinal direction. The accessory track has a pair of side walls that define a channel therebetween and a pair of lip portions that extend from upper ends of respective ones of the side walls defining a gap therebetween open to the channel. The tailgate has a first end pivotally attached to a rear of the vehicle cargo area for pivoting movement between a closed position covering the tailgate opening between the first side cargo wall and the second side cargo wall and an open position exposing the tailgate opening. A gap is defined between a rear end of the bed floor and the first end of the tailgate. The tailgate gap cover has an attachment structure that includes a first part and a second part. The first part is inserted into the channel between the side walls of the accessory attachment track. The second part is positioned above the pair of lip portions of the accessory attachment track. A fastening member extends between the first part and the second part clamping the attachment structure to the lip portions of accessory attachment track such that the tailgate gap cover is removable and re-attachable to the accessory attachment track. The tailgate gap cover is pivotal between a horizontal orientation with the tailgate in the open position and an upright orientation with the tailgate in the closed position, with the tailgate gap cover covering the gap with the tailgate in the open position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
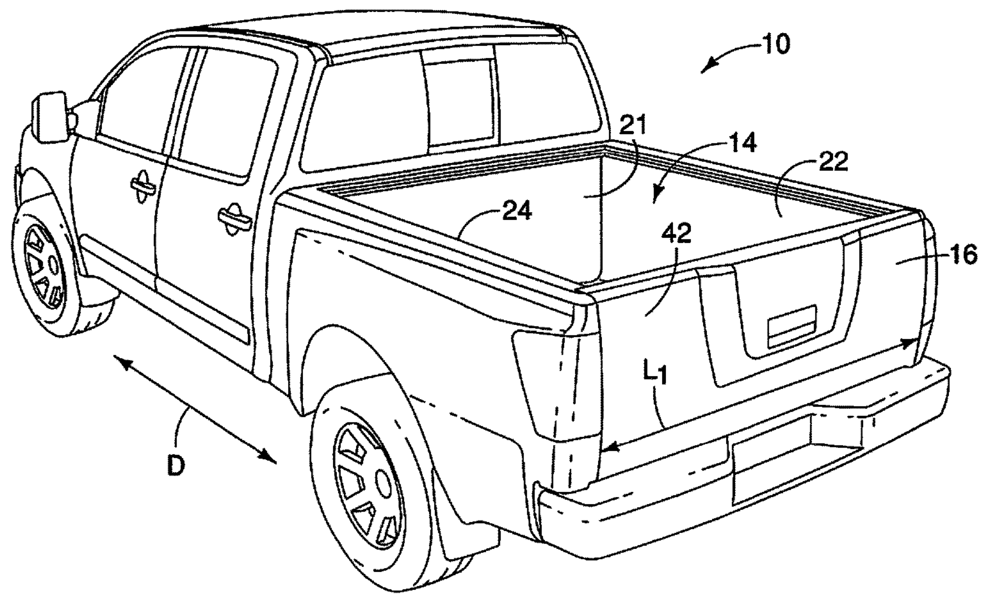
FIG. 1 is a perspective view of a vehicle that includes a cargo area having a tailgate shown in an upright or closed position in accordance with the various embodiments.
Figure 2:
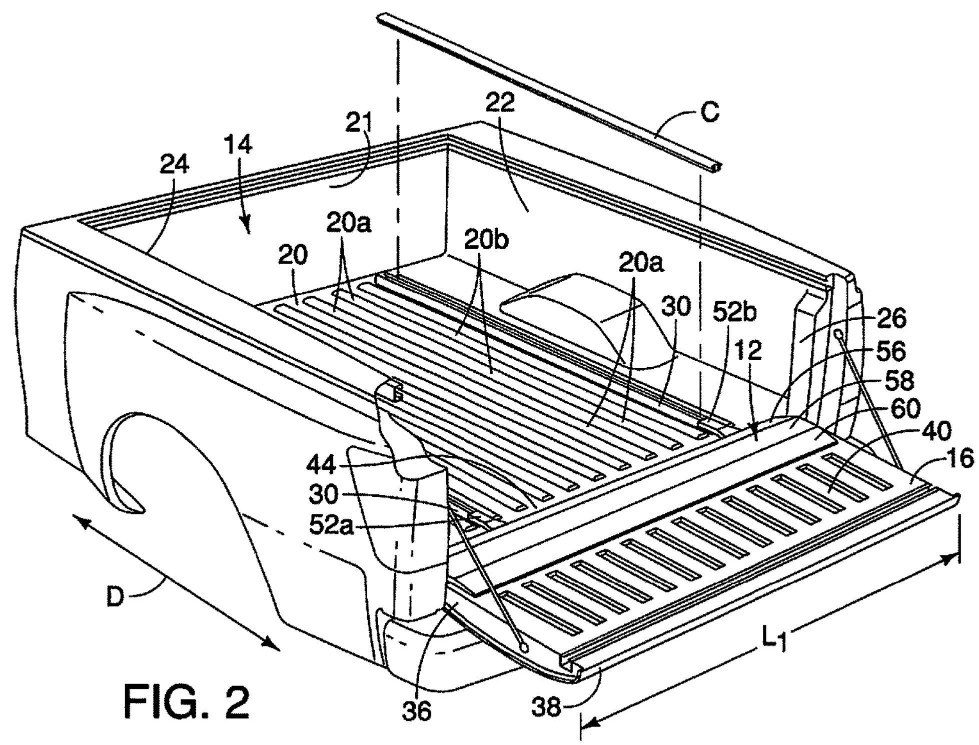
FIG. 2 is a perspective view of the cargo area showing a bed floor with accessory attachment tracks, the tailgate in a lowered or open position with a tailgate gap cover in a lowered or horizontal orientation covering a gap between the tailgate and the rear end of the cargo area in accordance with a first embodiment.

Referring initially to FIGS. 1 and 2, a vehicle 10 that includes a tailgate gap cover 12 (FIG. 2) is illustrated in accordance with a first embodiment. As is described in greater detail below, the tailgate gap cover 12 is an accessory that covers a gap G (FIGS. 3 and 4) defined between a cargo area 14 and a tailgate 16 of the vehicle 10.

Figure 3:
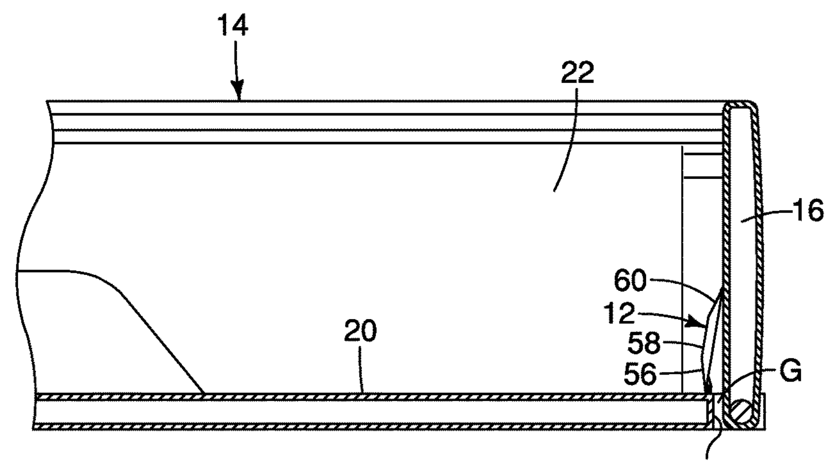
FIG. 3 is a side view of the cargo area showing the tailgate in a closed position with the tailgate gap cover in an upright orientation in accordance with the first embodiment.
Figure 4:
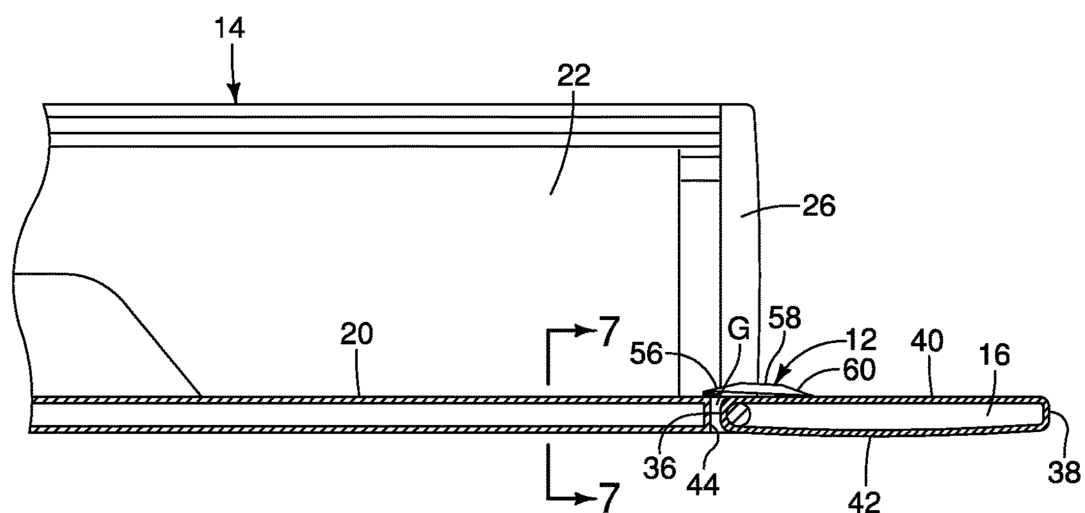
FIG. 4 is another side view of the cargo area similar to FIG. 3 showing the tailgate in the open position with the tailgate gap cover in the horizontal orientation covering the gap between the tailgate and the rear end of the cargo area in accordance with the first embodiment.

Before describing the tailgate gap cover 12, a description of the cargo area 14 is provided with specific reference to FIGS. 2-4. The cargo area 14 basically includes a bed floor 20, a front wall 21, a first side cargo wall 22 and a second side cargo wall 24, with a tailgate opening 26 being defined between rearward ends of the first cargo wall 22 and second cargo wall 24.

The bed floor 20 has a generally flat overall contour, except that a plurality of upwardly projecting ribs **20*a* are embossed or molded into the sheet metal that forms the bed floor 20 to provide greater rigidity and cargo-carrying strength to the bed floor 20. A plurality of recesses 20*b* is defined between each adjacent pair of the ribs 20*a*. Two utility tracks or accessory attachment tracks 30 are fastened to the bed floor 20. The accessory attachment tracks 30 are elongated members that extend in a direction parallel to a vehicle longitudinal direction D. Each accessory attachment track 30 is located between adjacent pairs of the ribs 20*a* within a corresponding one of the recesses 20*b* extending along the bed floor 20 of the cargo area 14 from adjacent the front wall 21 to adjacent the tailgate opening 26. One accessory attachment track 30 is located near but spaced apart from the first side cargo wall 22 and the other accessory attachment track 30 is located near but spaced apart from the second side cargo wall 24, as shown in FIG. 2. The first side cargo wall 22 and the second side cargo wall 24 can also optionally be fitted with additional accessory attachment tracks 30**.

Figure 16:
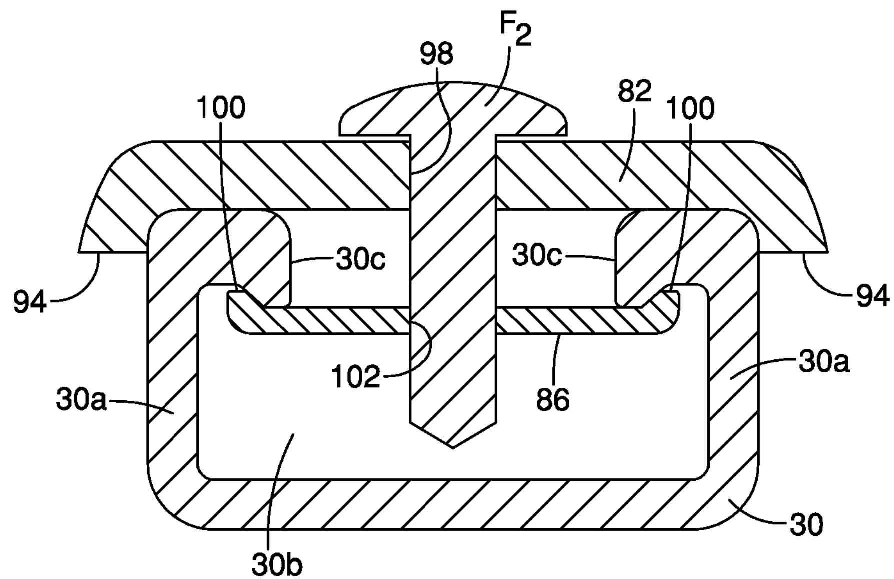
FIG. 16 is a cross-sectional view of the first one of the hinge assemblies taken along the line 16-16 in FIG. 12 in accordance with the first embodiment.
Figure 17:
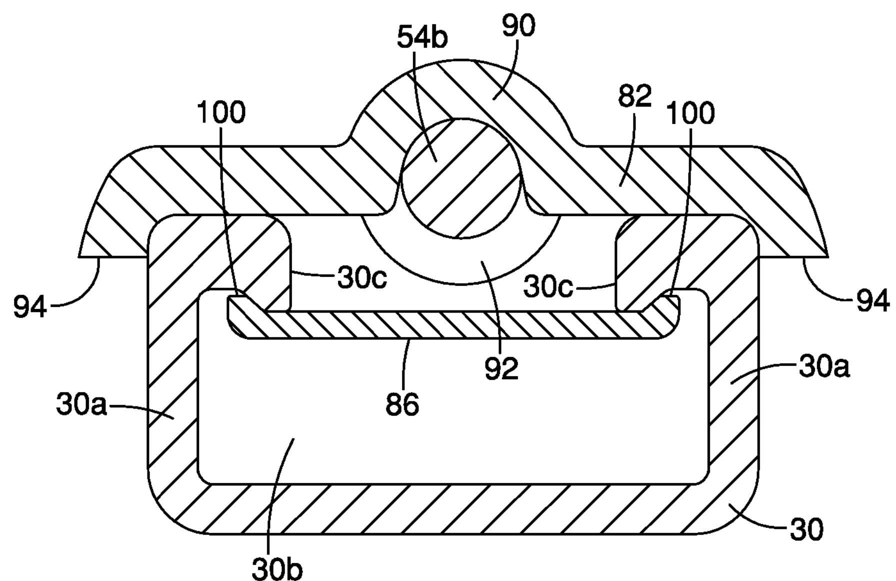
FIG. 17 is a cross-sectional view of the second one of the hinge assemblies taken along the line 17-17 in FIG. 13 showing the one end of the torsion bar retained by the first bracket of the second one of the hinge assemblies in accordance with the first embodiment.
Figure 18:
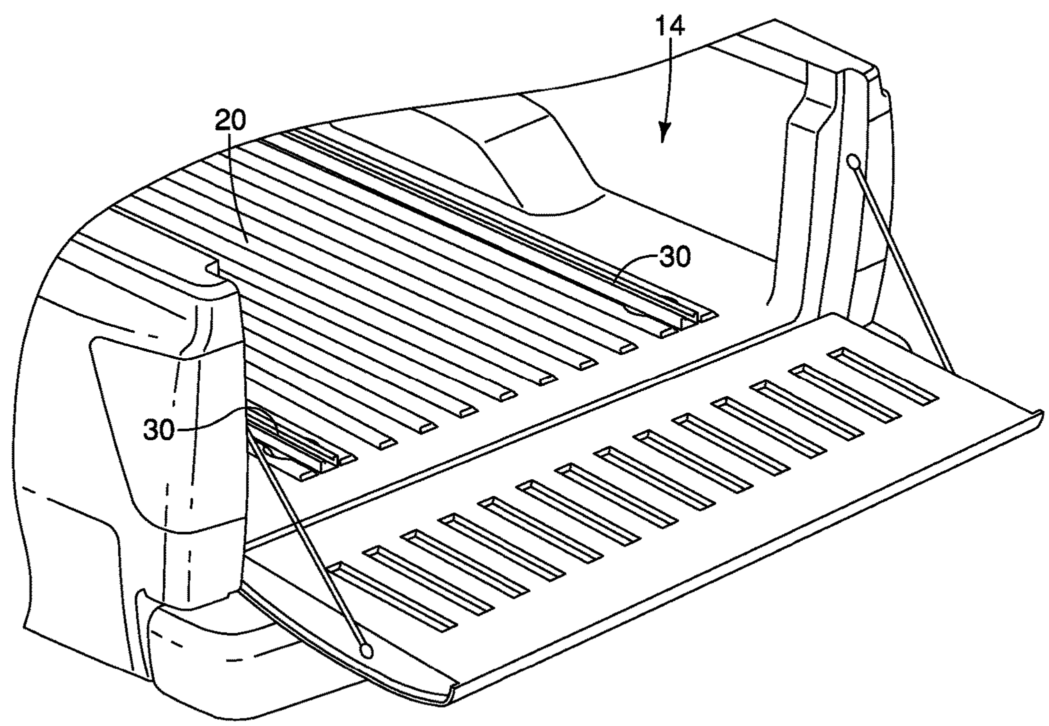
FIG. 18 is a rear perspective view of the cargo area similar to FIG. 2 showing the bed floor, the accessory attachment tracks and the tailgate in the open position prior to installation of the tailgate gap cover in accordance with a first embodiment.
Figure 19:
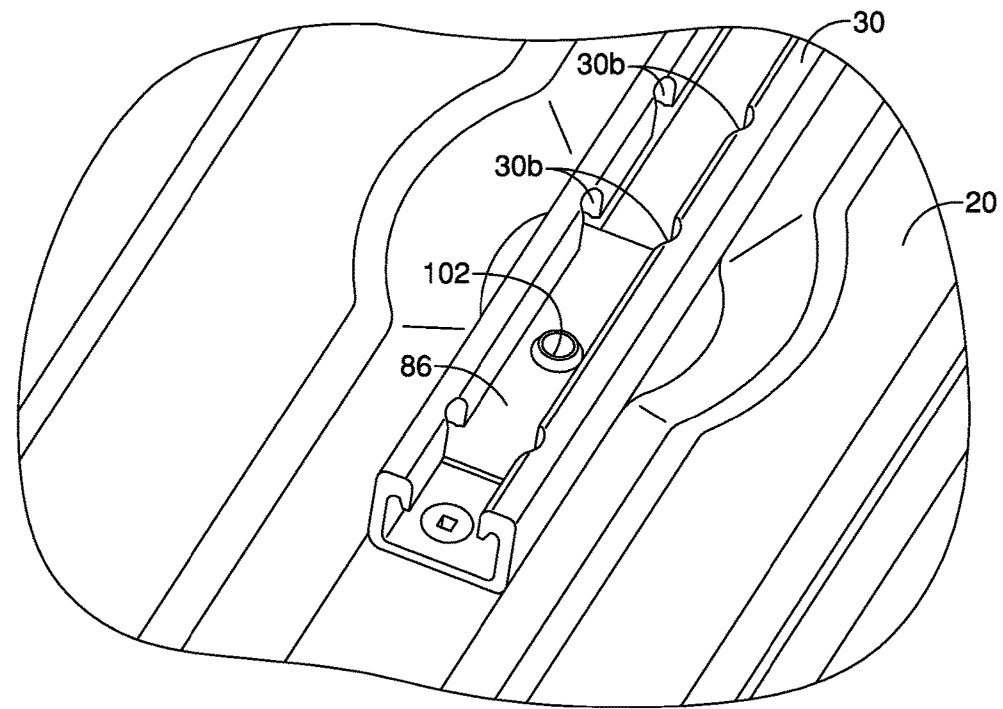
FIG. 19 is a perspective view of a portion of the cargo area showing the clamping bracket inserted into one of the accessory attachment tracks such that the tailgate gap cover can thereafter be installed in accordance with the first embodiment.
Figure 20:
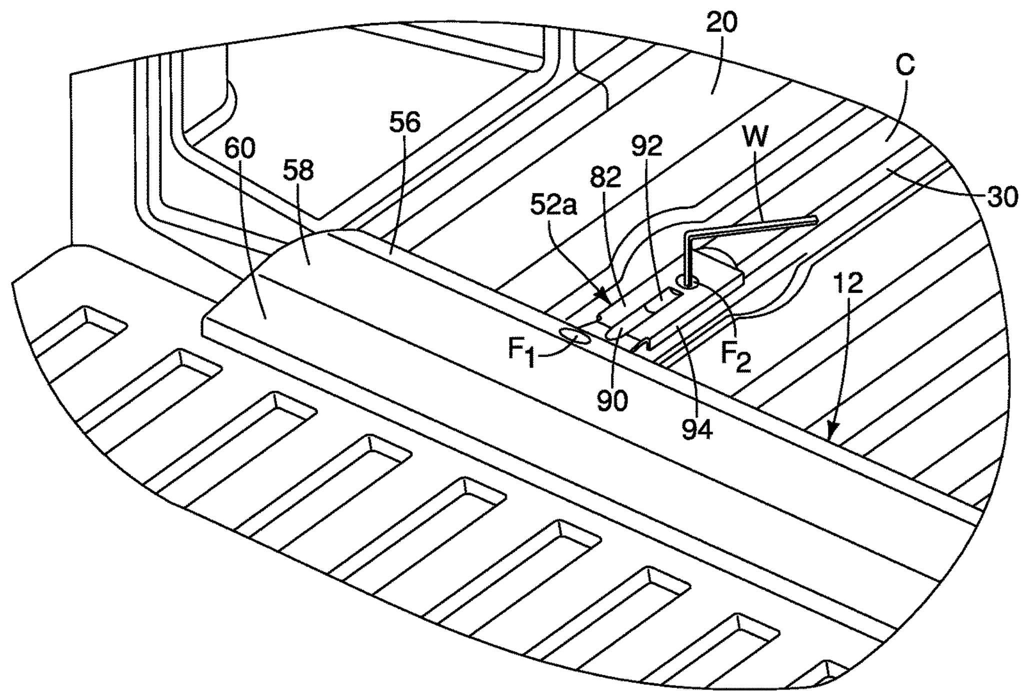
FIG. 20 is another perspective view of a portion of the cargo area showing the tailgate gap cover being positioned over the gap between the bed floor and the tailgate, and with one of the hinge assemblies placed over the one of the accessory attachment tracks and the clamping brackets with a fastener being tightened to clamp the hinge assembly to the accessory attachment track in accordance with the first embodiment.

As shown in FIGS. 16 and 17, each of the accessory attachment tracks 30 has a U-shape in cross-section. The accessory attachment tracks 30 each have side walls **30*a* defining a channel 30*b* therebetween. Upper ends of the side walls 30*a* have opposing upper ends with lip portions that defining an elongated opening 30*c*. The lip portions include arcuate recesses 30*d* (FIG. 21) at spaced apart locations along the elongated opening 30*c*. As shown in FIG. 1, each of the accessory attachment tracks 30 can be concealed with a removable cover C that slides into the accessory attachment track 30, covering the elongated slot 30*c* (shown in an installed state in FIG. 2). The accessory attachment track 30** is a feature that is described in greater detail in, for example, U.S. Pat. No. 6,846,140 to Anderson et al., issued Jan. 25, 2005. U.S. Pat. No. 6,846,140 is incorporated herein by reference in its entirety.

The tailgate 16 has a first end 36, a second end 38, a first surface 40 and a second surface 42. The tailgate 16 has a lateral length $L_1$ measured in a horizontal direction that is perpendicular to the vehicle longitudinal direction D. The first end 36 is pivotally attached to a rear of the cargo area 14 for pivoting movement between a closed position (FIGS. 1 and 3) covering the tailgate opening 26 and an open position (FIGS. 2 and 4) exposing the tailgate opening 26. In the closed position, the tailgate 16 is in a generally upright or vertical orientation with the first end 36 facing downward and the second end 38 facing upward. In the open position, the tailgate 16 is in a generally horizontal or inclined orientation with the first end 36 facing a rear end 44 of the cargo area 14 and the second end 38 facing rearward. The gap G is defined between the rear end 44 of the bed floor 20 and the first end 36 of the tailgate 16, in particular when the tailgate 16 is in the open position.

A description of the tailgate gap cover 12 is now provided with reference to FIGS. 3-21. The tailgate gap cover 12 basically includes a main portion 50, two hinge assemblies 52*a* and 52*b*, and a biasing member 54. In the first embodiment, the tailgate gap cover 12 is fastened to the accessory attachment track 30 proximate the rear end 44 of the cargo area 12 in a manner described in greater detail below. The tailgate gap cover 12 is configured to pivot between a horizontal orientation (FIG. 4) with the tailgate 16 in the open position and an upright orientation (FIG. 3) with the tailgate 16 in the closed position. In both positions, the tailgate gap cover 12 covers the gap G.

Figure 5:
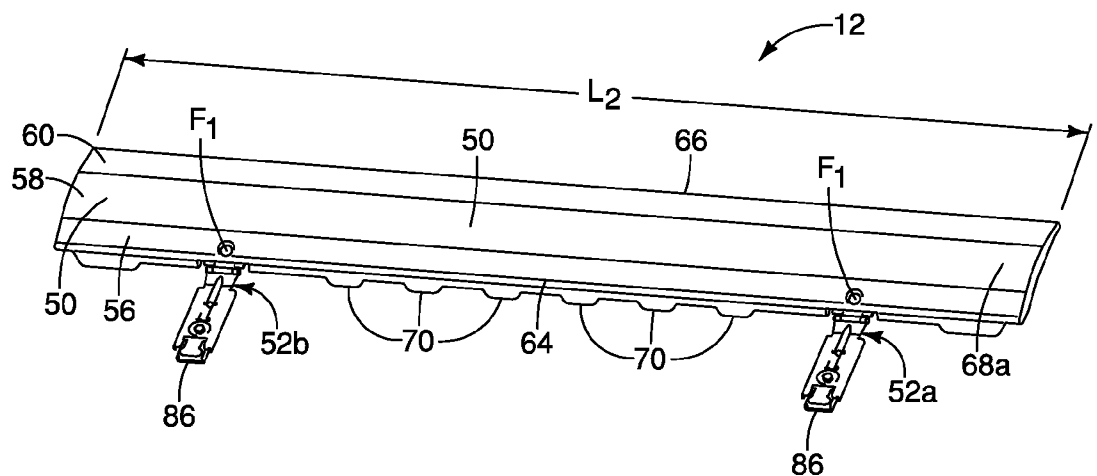
FIG. 5 is a perspective view of an upper surface of the tailgate gap cover with the tailgate gap cover removed from the vehicle showing a pair of hinge assemblies configured to attach the tailgate gap cover to the cargo area of the vehicle in accordance with the first embodiment.
Figure 6:
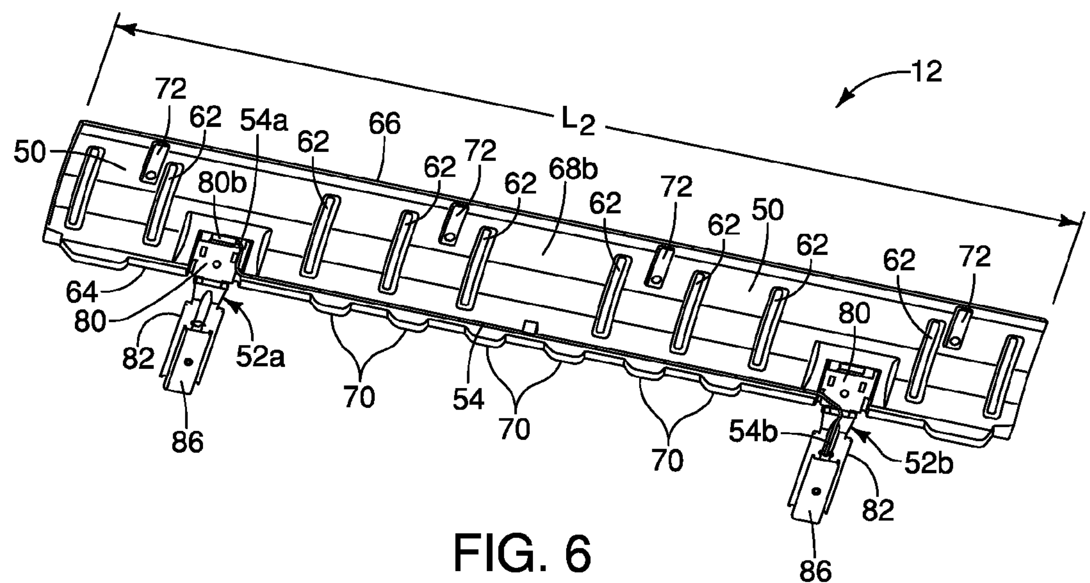
FIG. 6 is another perspective view of an underside surface of the tailgate gap cover removed from the vehicle, showing the pair of hinge assemblies and a torsion bar extending between the pair of hinge assemblies in accordance with the first embodiment.

As shown in FIGS. 5 and 6, the main portion 50 of the tailgate gap cover 12 has a first planar portion 56, a second planar portion 58, a third planar portion 60 and a plurality of ribs 62. The first planar portion 56, the second planar portion 58 and the third planar portion 60 each have an overall length $L_2$ (FIGS. 5 and 6) that is approximately equal to or slightly smaller than the lateral length $L_1$ of the tailgate 16 (FIGS. 1 and 2). As shown in FIG. 5, the first planar portion 56 defines a first planar surface 56*a*, the second planar portion 58 defines a second planar surface 58*a*, and the third planar portion 60 defines a third planar surface 60*a*.

The tailgate gap cover 12 also has a forward peripheral edge 64, a rearward peripheral edge 66, an upper surface 68*a* and an underside surface 68*b*. The upper surface 68*a* is typically exposed regardless of the orientation of the tailgate gap cover 12. The underside surface 68*b* faces the tailgate 16 and faces the bed floor 20 when the tailgate 16 is in the open position and when the tailgate gap cover 12 is in the horizontal orientation covering the gap G.

The ribs 62 are located along the underside surface 68*b*, as shown in FIG. 6. The ribs 62 are stiffening ribs that extend in a direction perpendicular to the length $L_2$ of the main portion 50 from the first planar portion 56 to the third planar portion 60 along an underside of the main portion, as shown in FIG. 6. The first, second and third planar portions 56, 58 and 60 are made of metal with the ribs 62 welded to an underside thereof, as shown in FIG. 6. Further, the first, second and third planar portions 56, 58 and 60 can be made, for example, as a single metal plate that is bent slightly such that the first planar portion 56 is slightly angularly offset from the second planar portion 58 and the second planar portion 58 is slightly angularly offset from the third planar portion 60. The first, second and third planar surfaces 56*a*, 58*a* and 60*a* define a ramp or bridge shape as viewed from the side in FIG. 4 with the tailgate gap cover 12 in the horizontal orientation. The underside surface 68*b* can also be provided with a plurality of rubber or elastic polymer bumper members 72. The bumper members 72 project from the underside surface 68*b* of the tailgate gap cover 12 with a thickness ensuring contact with the tailgate 16. The bumper members 72 are dimensioned and formed to reduce or eliminate noise that might otherwise be generated via contact between the tailgate 16 and the tailgate gap cover 12.

It should be understood from the drawings and the description herein that the main portion 50 can alternatively be completely flat with the ribs 62 being omitted.

Figure 7:
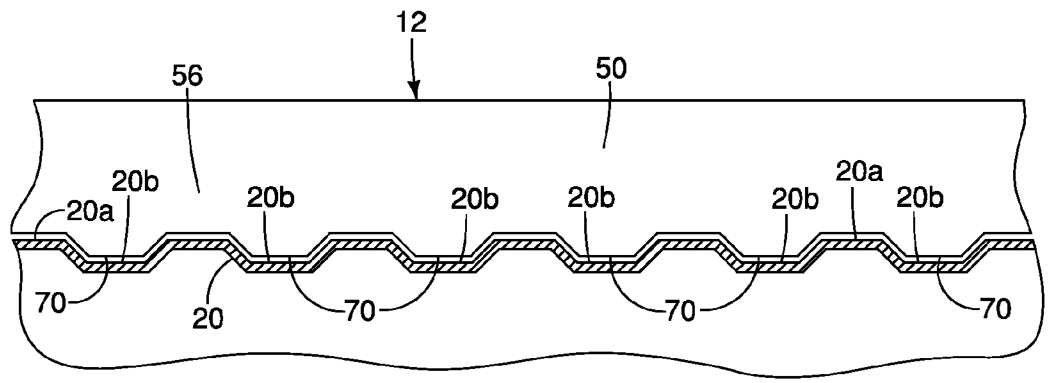
FIG. 7 is a cross-sectional view of the cargo area of the vehicle taken along the line 7-7 in FIG. 4 showing downwardly extending projections formed along a forward peripheral edge of the tailgate gap cover with the downwardly extending projections mating with ribs and recesses defined along a bed floor of the cargo area of the vehicle in accordance with the first embodiment.
Figure 8:
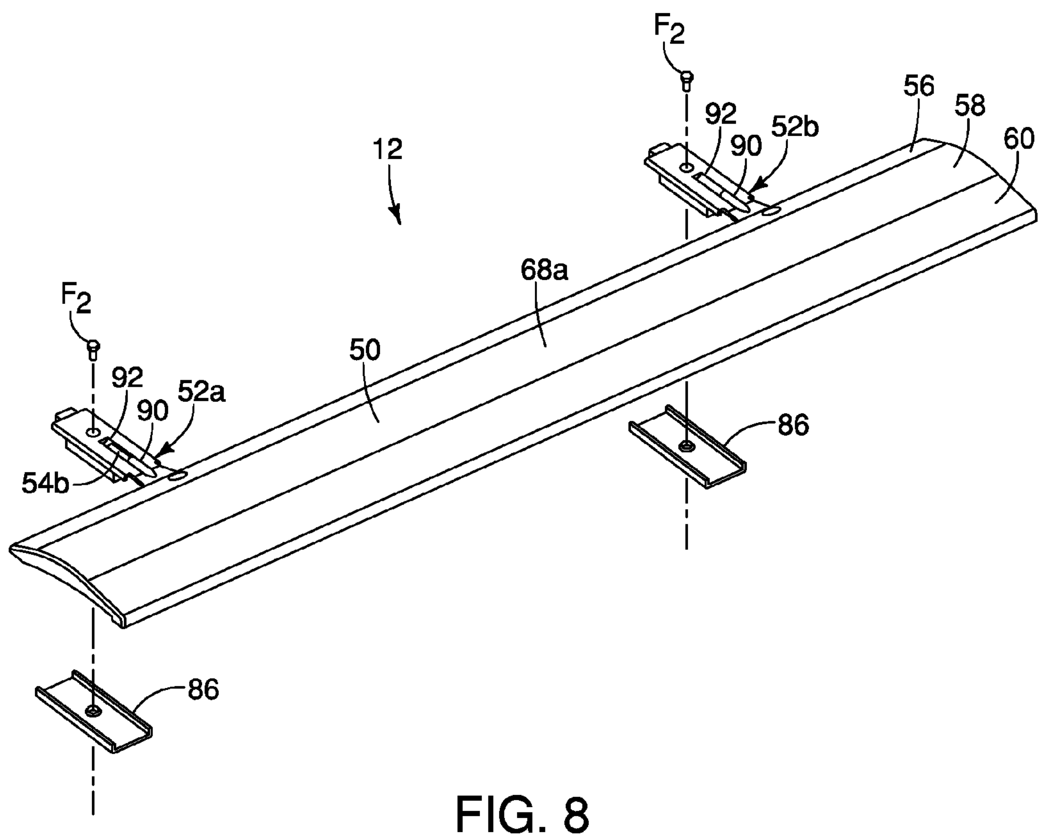
FIG. 8 is yet another perspective view of the tailgate gap cover with the tailgate gap cover removed from the vehicle showing a first bracket and clamping bracket of each of the pair of hinge assemblies in accordance with the first embodiment.

The forward peripheral edge 64 defines a cargo bed floor contacting portion and the rearward peripheral edge 66 defines a tailgate contacting edge portion. The forward peripheral edge 64 includes a plurality of projections 70. As shown in FIG. 7, the projections 70 are spaced apart from one another such that they align and extend into the recesses 20*b* of the bed floor 20 of the cargo area 14 with the tailgate gap cover 12 in the horizontal orientation.

A description of the hinge assemblies 52*a* and 52*b* is now provided with specific reference to FIGS. 5-6 and 8-21. The two hinge assemblies 52*a* and 52*b* are basically identical and have all of the same features, except that each connects to the spring member 54 in a different manner, as is explained in greater detail below.

Each of the hinge assemblies 52*a* and 52*b* shown in FIGS. 5-6, 8 and 10 includes a first bracket 80, a second bracket 82, a pivot pin 84 and a clamping bracket 86.

As shown in FIG. 5, the first bracket 80 is a square or rectangular shaped plate that attached to the underside surface 68*b* of the main portion 50 via, for example, a mechanical fastener $F_1$. The first bracket 80 is connected to the second bracket 82 by the pivot pin 84 for pivoting movement about a pivot axis $A_1$ defined by the pivot pin 84. Specifically, the first bracket 80 pivots relative to the second bracket 82 about pivot axis $A_1$. Further, with the tailgate gap cover 12 attached to the accessory attachment tracks 30 in a manner described below, the tailgate gap cover 12 also pivots about the pivot axis $A_1$. Hence, when the tailgate 16 is moved between the open position and the closed position, the tailgate gap cover 12 can pivot about the pivot axis $A_1$ thereby moving with the tailgate 16 between the upright orientation and the horizontal orientation depicted in FIGS. 3 and 4.

Figure 10:
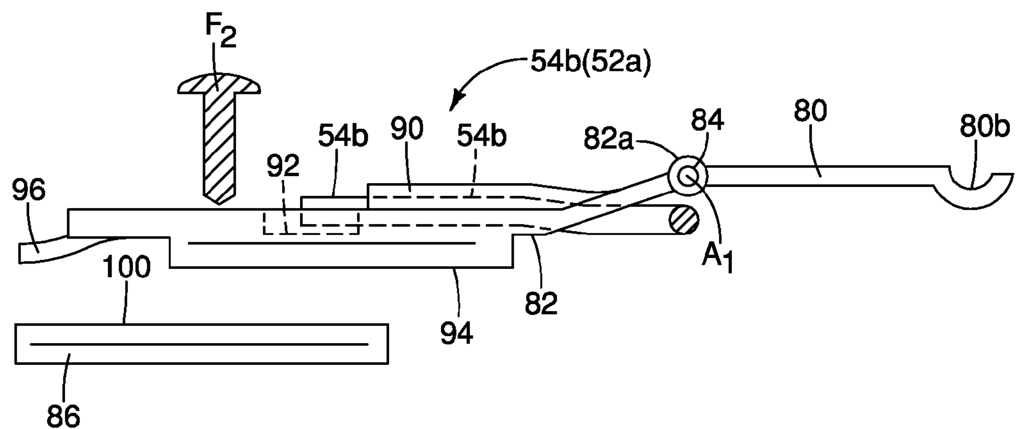
FIG. 10 is an exploded side view of one of the hinge assemblies showing the first bracket, a second bracket, a pivot pin connecting the first bracket to the second bracket, the clamping bracket and a fastener in accordance with the first embodiment.
Figure 11:
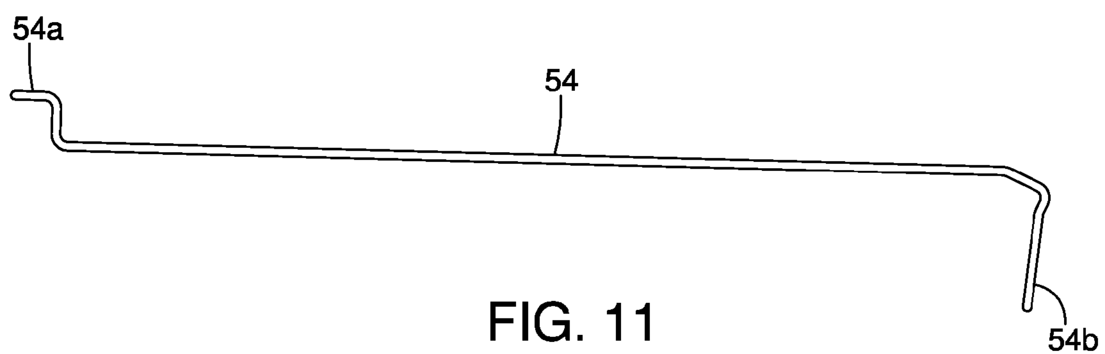
FIG. 11 is a perspective view of the torsion bar shown removed from the tailgate gap cover in accordance with the first embodiment.
Figure 14:
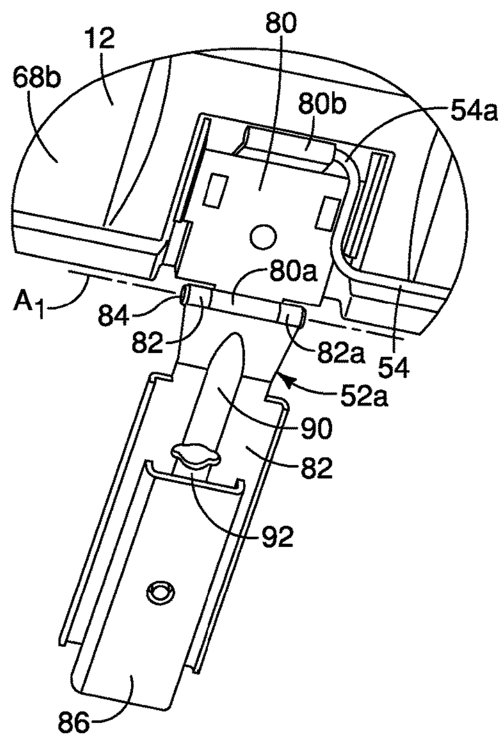
FIG. 14 is a perspective view of the first one of the hinge assemblies and an adjacent portion of the underside surface of the tailgate gap cover showing the fastener extending threadedly attached to the clamping bracket and with another end of the torsion bar retained by a second bracket of the first one of the hinge assemblies in accordance with the first embodiment.
Figure 15:
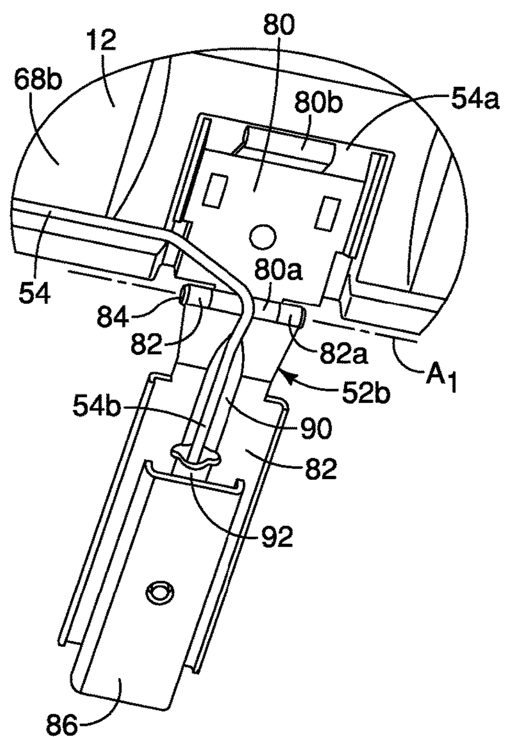
FIG. 15 is a perspective view of the second one of the hinge assemblies and an adjacent portion of the underside surface of the tailgate gap cover showing the one end of the torsion bar retained by the first bracket of the second one of the hinge assemblies in accordance with the first embodiment.

As shown in FIGS. 10, 14 and 15, the first bracket 80 has a first end with a cylindrical portion 80*a* that receives the pivot pin 48 and a second end formed with a curved flange 80*b*. The curved flange 80*b* is shaped and configured to receive and retain a first end 54*a* of the biasing member 54.

The second bracket 82 is an elongated plate member that includes a pair of cylindrical portions 82*a* (defining a first end) and a main body 82*b*. The cylindrical portions 82*a* are dimensioned to receive the pivot pin 48 for pivoting movement about the pivot axis $A_1$ and the pivot pin 84 relative to the first bracket 80. The main body 82*b* includes a first contoured portion 90, a second contoured portion 92, curved edges 94, a distal end 96 and a fastener receiving portion 98.

The first contoured portion 90 and the second contoured portion 92 of the second bracket 82 define aligned pocket portions that receive a second end 54*b* of the biasing member 54. More specifically, the second end 54*b* of the biasing member 54 is inserted into the second bracket 82 such that one side of the first end 54*b* is restrained by the first contoured portion 90 and another side of the first end 54*b* is restrained by the second contoured portion 92, as shown in FIG. 17. The second end 54*b* is inserted into first contoured portion 90 and the second contoured portion 92 from an area adjacent to the cylindrical portions 82*a* (a right side of FIG. 10.

During attachment of the hinge assemblies 52*a* and 52*b* to the main portion 50 of the tailgate gap cover 12, the first end 54*a* of the biasing member 54 is placed between the underside surface 68*b* of the main portion 50 and the curved flange portion 80*b* of the hinge assembly 52*a*, as shown in FIG. 6. Further, the second end 54*b* of the biasing member 54 is inserted between the first contoured portion 90 and the second contoured portion 92 of the second bracket 82 of the hinge assembly 52*b*, as is also shown in FIG. 6. The biasing member 54 is shown removed from the tailgate gap cover 12 in FIG. 11. The biasing member 54 is shaped and dimensioned such that when installed to the hinge assemblies 52*a* and 52*b* and the tailgate gap cover 12, the biasing member 54 acts as a torsion bar biasing the tailgate gap cover 12 into engagement with the tailgate 14, regardless of the position of the tailgate 14 (open position or closed position).

As shown in FIGS. 16 and 17; the curved edges 94 of the second bracket 82 of each of the hinge assemblies 52*a* and 52*b* extend over upper edges of the side walls 30*a* of the accessory attachment tracks 30. As shown in FIG. 16, the fastener $F_2$ is installed through an aperture in the fastener receiving portion 98 of the second bracket 82 and into the clamping bracket 86 such that the clamping bracket 86 and the second bracket 82 are drawn toward one another clamping the hinge assemblies 52*a* and 52*b* to a corresponding one of the accessory attachment tracks 30.

Figure 9:
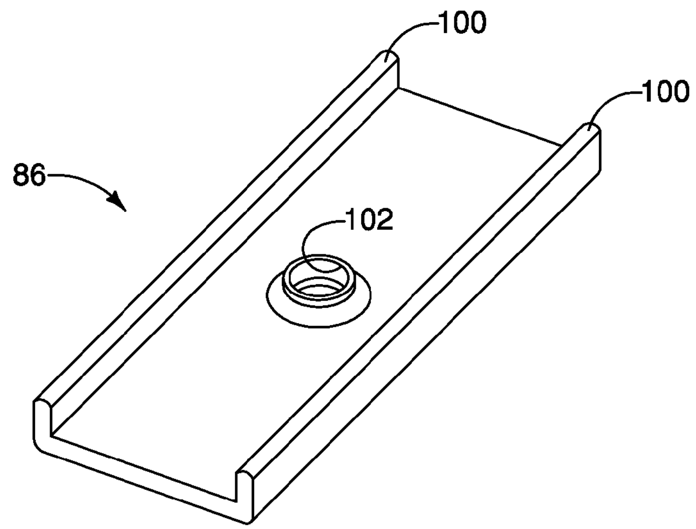
FIG. 9 is a perspective view of the clamping bracket shown removed from the hinge assemblies in accordance with the first embodiment.

As shown in FIG. 9, the clamping bracket 86 is a flat plate-like member that has upwardly extending edge portions or curved edges 100 and a centrally located fastener receiving portion 102. As is shown in FIGS. 16 and 17, the curved edges 100 engage downwardly projecting lips formed at the upper ends of the side walls 30*a* of the accessory attachment tracks 30 restricting movement of the hinge assemblies 52*a* and 52*b*. The fastener $F_2$ extends into a threaded aperture in the fastener receiving portion 102 of the clamping bracket 86 serving to draw the clamping bracket 86 toward the second bracket 82 generating clamping force therebetween.

Figure 12:
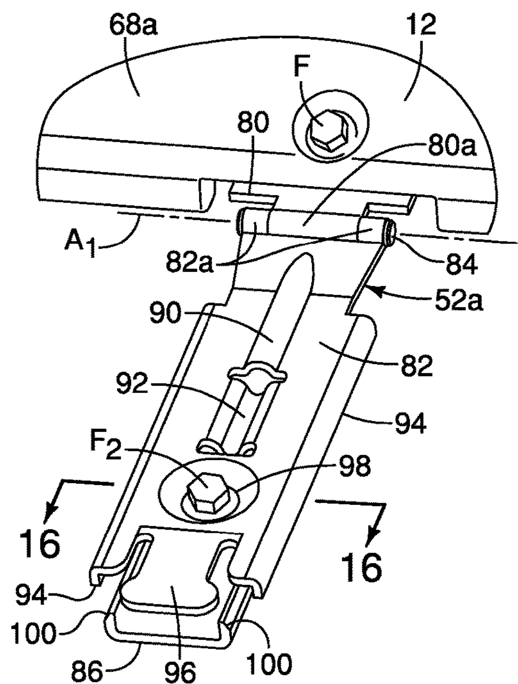
FIG. 12 is a perspective view of a first one of the hinge assemblies and an adjacent portion of the upper surface of the tailgate gap cover showing the fastener extending through an aperture in the first bracket and threadedly attached to the clamping bracket in accordance with the first embodiment.
Figure 13:
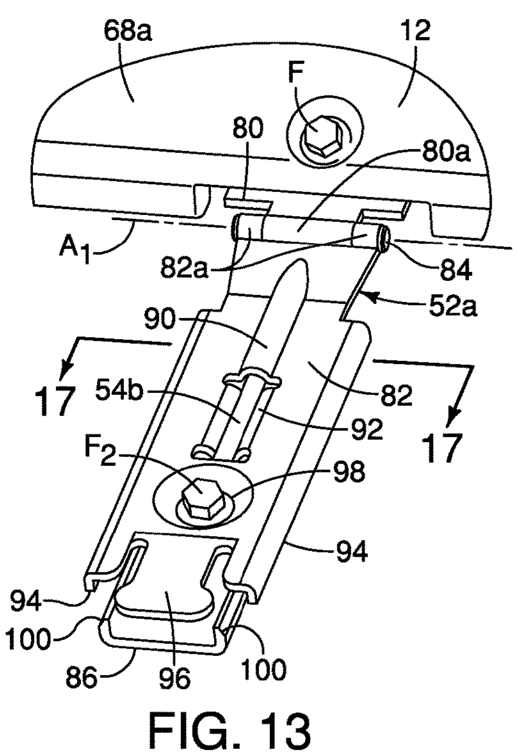
FIG. 13 is a perspective view of a second one of the hinge assemblies and an adjacent portion of the upper surface of the tailgate gap cover showing one end of the torsion bar retained by the first bracket of the second one of the hinge assemblies in accordance with the first embodiment.
Figure 21:
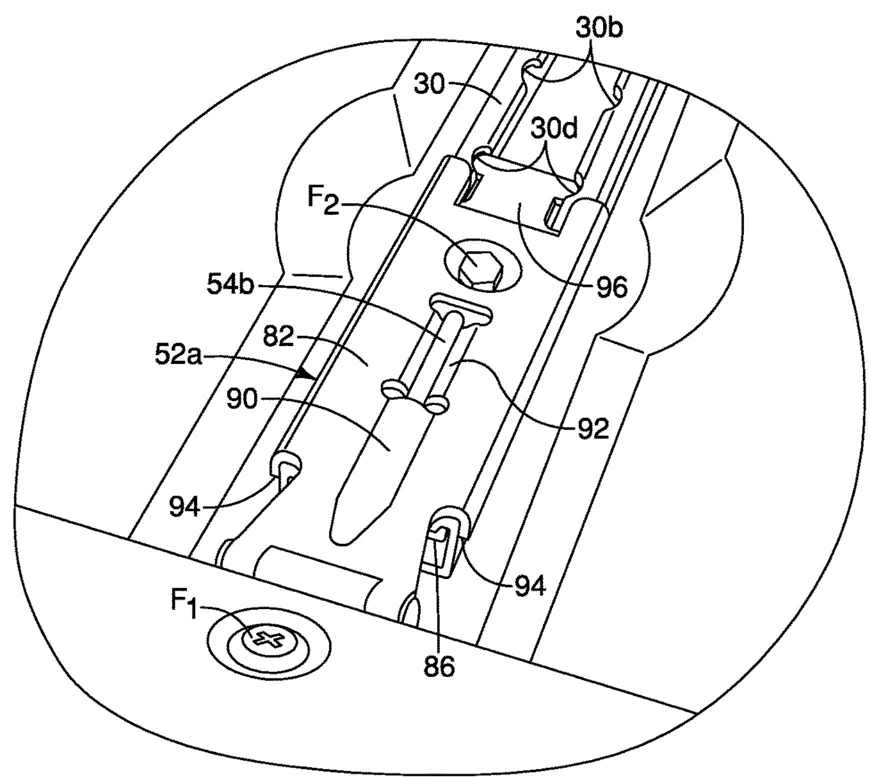
FIG. 21 is another perspective view of a portion of the cargo area showing the tailgate gap cover clamped to the one of the accessory attachment tracks in accordance with the first embodiment.
Figure 22:
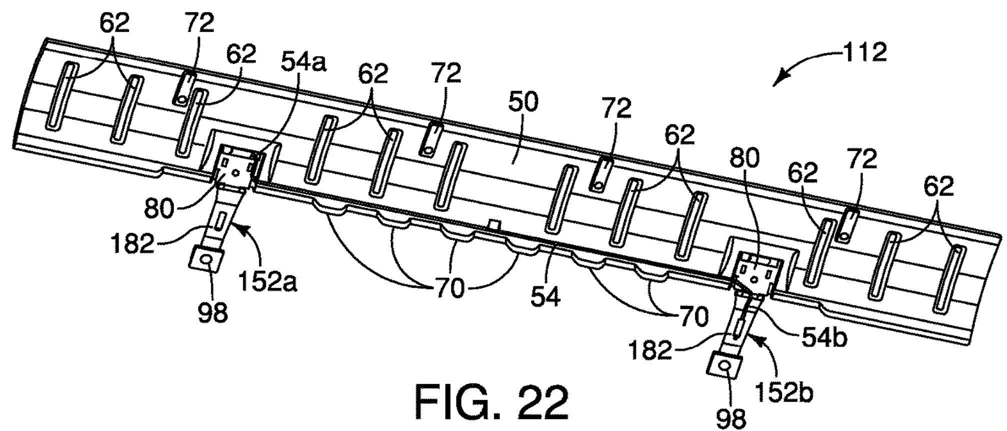
FIG. 22 is a perspective view of an underside surface of a tailgate gap cover removed from the vehicle, showing a pair of hinge assemblies and a torsion bar extending between the pair of hinge assemblies in accordance with a second embodiment.
Figure 23:
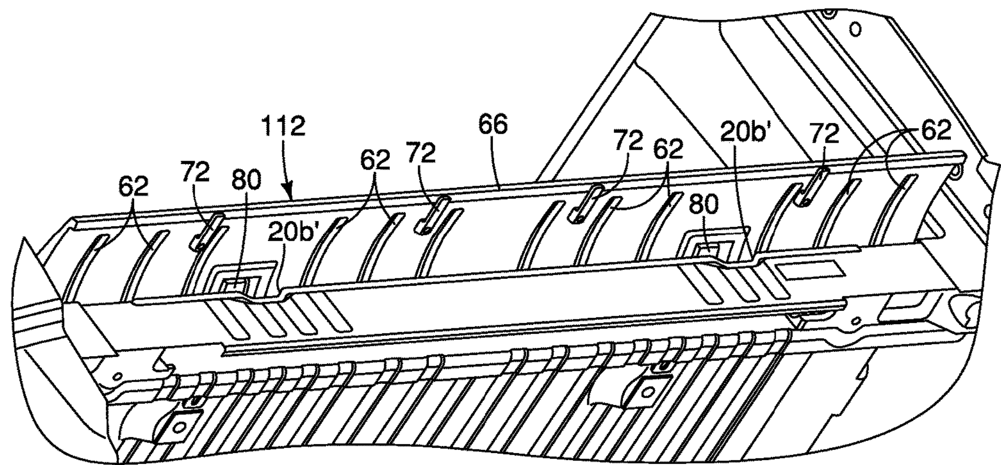
FIG. 23 is a perspective view of a rear end of the vehicle with the tailgate removed showing the underside surface of the tailgate gap cover and recesses in the cargo area floor that receive the hinge assemblies of the tailgate gap cover in accordance with the second embodiment.

As shown in FIGS. 12, 13 and 21, the distal end 96 of the second bracket 82 includes lateral projections. With the hinge assemblies 52*a* and 52*b* installed to respective ones of the accessory attachment tracks 30, the lateral projections of the distal end 96 fit within the arcuate recesses 30*d* of the accessory attachment tracks 30, assisting in installing and locating the tailgate gap cover 12 in position relative to the accessory attachment tracks 30 and the bed floor 20 of the cargo area 14.

It should be understood from the drawings and the description herein that the hinge assemblies 52*a* and 52*b* basically define attachment structures of the tailgate gap cover 12. The clamping bracket 86 and second bracket 82 basically define first and second parts of that attachment structure.

Second Embodiment

Referring now to FIGS. 22-25, a tailgate gap cover 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The tailgate gap cover 112 includes many of the features of the tailgate gap cover 12 of the first embodiment. Specifically, the tailgate gap cover 112 includes the main portion 50 and the biasing member 54 as described above with respect to the first embodiment. The main portion 50 of the tailgate gap cover 112 includes the first planar portion 56, the second planar portion 58, the third planar portion 60, the plurality of ribs 62, the forward peripheral edge 64 with the plurality of projections 70, the rearward peripheral edge 66 and the bumper members 72, as described above with respect to the first embodiment. Further, the biasing member 54 includes the first end 54*a* and the second end 54*b*, as described above with respect to the first embodiment.

Figure 24:
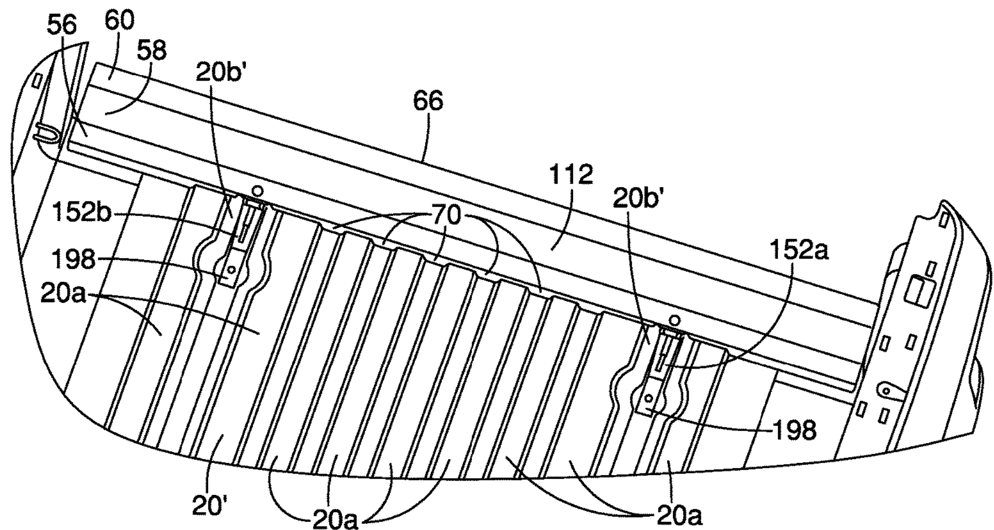
FIG. 24 is a top perspective view of the cargo area floor showing the tailgate gap cover attached directly to the cargo area floor in accordance with the second embodiment.
Figure 25:
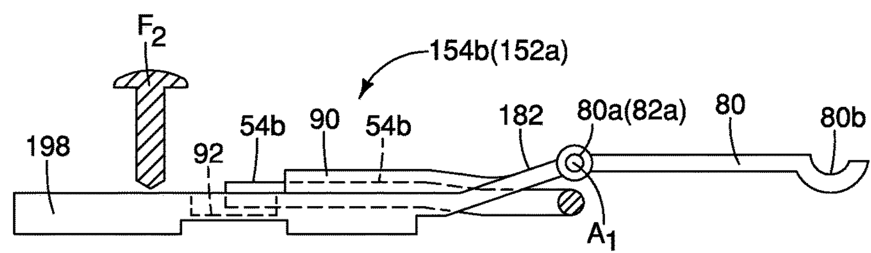
FIG. 25 is a side view of one of the hinge assemblies of the tailgate gap cover in accordance with the second embodiment.

However, in the second embodiment, the hinge assemblies 52*a* and 52*b* are replaced or modified such that the tailgate gap cover 112 installs directly to a bed floor 20' of the cargo area 14 of the vehicle 10 shown in FIG. 24. The bed floor 20' of the cargo area 14 is identical to the bed floor 20 described above with respect to the first embodiment, except that in the second embodiment, the accessory attachment tracks 30 are eliminated. In other words, there are no accessory attachment tracks 30 present on the bed floor 20'. Rather, in the second embodiment, hinge assemblies of the tailgate gap cover 112 are attached or fastened directly to the bed floor 20' of the cargo area 14.

Specifically, the tailgate gap cover 112 basically includes a first hinge assembly 152*a* (a first attachment structure) and a second hinge assembly 152*b* (a second attachment structure) that are both fixed directly to the bed floor 20' of the cargo area 14 via fasteners $F_2$. The first hinge assembly 152*a* and the second hinge assembly 152*b* are basically identical and only differ in their connection to the biasing member 54. The first hinge assembly 152*a* and the second hinge assembly 152*b* have many of the features of the hinge assemblies 52*a* and 52*b*. For example, each of the first hinge assembly 152*a* and the second hinge assembly 152*b* includes the first bracket 80, including the cylindrical portion 80*a* and the curved flange 80*b*, as described above with respect to the first embodiment. The cylindrical portion 80*a* receives the pivot pin 84, and the curved flange 80*b* receives the first end 54*a* of the biasing member 54.

Each of the first hinge assembly 152*a* and the second hinge assembly 152*b* further includes a second bracket 182. The brackets 182 have many of the features of the brackets 82 of the first embodiment, such as the pair of cylindrical portion 82*a* that receive the pivot pin 84. The bracket 182 of each of the first hinge assembly 152*a* and the second hinge assembly 152*b* also includes the first contoured portion 90 and the second contoured portion 92 (as described above with respect to the first embodiment). The first contoured portion 90 and the second contoured portion 92 receive the second end 54*b* of the biasing member 54 thereby retraining movement of the second end 54*b* of the biasing member. Hence, in the second embodiment, the biasing member 54 serves as a torsion bar that biases movement of the tailgate gap cover 112 toward the horizontal orientation and into contact with the adjacent surface of the tailgate 16 with the tailgate 16 in both the open position and the closed position.

The brackets 182 also include a fastener receiving portion 198 with an aperture that receives the fastener $F_2$. Hence, the brackets 182 have many of the features of the brackets 82 of the hinge assemblies 52*a* and 52*b* of the first embodiment. However, the fastener receiving portion 198 is shaped and configured to rest directly on the exposed surface of recesses 20*b*' the bed floor 20' of the cargo area 14.

Hence, the first hinge assembly 152*a* and the second hinge assembly 152*b* are structured such that the tailgate gap cover 112 is pivotal between a horizontal orientation with the tailgate 16 in the open position and an upright orientation with the tailgate 16 in the closed position. Further, as with the first embodiment, the tailgate gap cover 112 covers the gap G with the tailgate 16 in the open position. Further, as with the first embodiment, the biasing member 54 and the first hinge assembly 152*a* and the second hinge assembly 152*b* define a biasing structure that biases the tailgate gap cover 112 into contact with the tailgate 16 in both the horizontal orientation and the upright orientation.

The features of the vehicle 10 are conventional components that are well known in the art. Since features of the vehicle 10 other than the tailgate gap covers 12 and 112 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle cargo bed structure. Accordingly, these terms, as utilized to describe the present invention should be interpreted relative to a vehicle equipped with the vehicle cargo bed structure.

The term "configured" as used herein to describe a component, section or part of a device includes mechanical structural elements that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cargo bed structure comprising a vehicle cargo area including a bed floor, a front wall, a first side cargo wall and a second side cargo wall, with a tailgate opening being defined at rearward ends of the first and second cargo walls;

an accessory attachment track attached to the bed floor, the accessory attachment track being an elongated member that extends in a vehicle longitudinal direction along the bed floor from adjacent to the front wall of the cargo area to adjacent to the tailgate opening, the accessory attachment track having a pair of side walls defining a channel therebetween and a pair of lip portions that extend from upper ends of respective ones of the side walls defining an elongated opening therebetween open to the channel, the pair of side walls, the pair of lip portions, the channel and the opening extending from adjacent to the front wall to adjacent to the tailgate opening;

a tailgate having a first end pivotally attached to a rear of the vehicle cargo area for pivoting movement between a closed position covering the tailgate opening between the first side cargo wall and the second side cargo wall and an open position exposing the tailgate opening, with a gap being defined between a rear end of the bed floor and the first end of the tailgate; and a tailgate gap cover having an attachment structure that includes a first part and a second part, the first part being inserted horizontally into a rear portion of the channel between the side walls of the accessory attachment track and below the pair of lip portions, and the second part being positioned above the pair of lip portions and the channel of the accessory attachment track with a fastening member extending between the first part and the second part clamping the attachment structure to the lip portions of accessory attachment track such that the tailgate gap cover is removable and re-attachable to the accessory attachment track, the tailgate gap cover further being pivotal between a horizontal orientation with the tailgate in the open position and an upright orientation with the tailgate in the closed position, with the tailgate gap cover covering the gap with the tailgate in the open position.

2. The vehicle cargo bed structure according to claim 1, wherein the bed floor includes a second accessory attachment track that extends from adjacent to the front wall to adjacent to the tailgate opening, and the tail gap cover includes a second attachment structure that clamps to the second accessory attachment structure, the attachment structure includes a first hinge assembly and a second hinge assembly.

3. The vehicle cargo bed structure according to claim 2, wherein the tailgate gap cover includes a biasing structure that biases the tailgate gap cover toward the horizontal orientation.

4. The vehicle cargo bed structure according to claim 3, wherein the biasing structure includes a torsion bar having a first end installed to the first hinge assembly and a second end attached to the second hinge assembly.

5. The vehicle cargo bed structure according to claim 1, wherein the tailgate gap cover includes a biasing structure that biases the tailgate gap cover toward the horizontal orientation and into contact with the tailgate.

6. A vehicle cargo bed structure comprising a vehicle cargo area including a bed floor, a first side cargo wall and a second side cargo wall, with a tailgate opening being defined at rearward ends of the first and second cargo walls;

an accessory attachment track attached to the bed floor, the accessory attachment track extending in a vehicle longitudinal direction, the accessory track having a pair of side walls defining a channel therebetween and a pair of lip portions that extend from upper ends of respective ones of the side walls defining an elongated opening therebetween open to the channel;

a tailgate having a first end pivotally attached to a rear of the vehicle cargo area for pivoting movement between a closed position covering the tailgate opening between the first side cargo wall and the second side cargo wall and an open position exposing the tailgate opening, with a gap being defined between a rear end of the bed floor and the first end of the tailgate; and a tailgate gap cover having an attachment structure that includes a first part and a second part, the first part being inserted into the channel between the side walls of the accessory attachment track and the second part being positioned above the pair of lip portions of the accessory attachment track with a fastening member extending between the first part and the second part clamping the attachment structure to the lip portions of accessory attachment track such that the tailgate gap cover is removable and re-attachable to the accessory attachment track, the tailgate gap cover further being pivotal between a horizontal orientation with the tailgate in the open position and an upright orientation with the tailgate in the closed position, with the tailgate gap cover covering the gap with the tailgate in the open position, the tailgate gap cover including a main portion having a plurality of stiffening ribs that extend parallel to the attachment structure.

7. The vehicle cargo bed structure according to claim 6, wherein the main portion of the tailgate gap cover includes an upper surface and a lower surface with the lower surface including a plurality of resilient members positioned to contact the tailgate.

8. The vehicle cargo bed structure according to claim 7, wherein the bed floor of the vehicle cargo area includes a plurality of ribs with recesses defined therebetween, and the lower surface of the main portion includes a forward end having a plurality of downwardly extending projections that extend into the recesses of the bed floor with the tailgate gap cover in the horizontal orientation.

9. A vehicle cargo bed structure comprising a vehicle cargo area including a bed floor, a first side cargo wall and a second side cargo wall, with a tailgate opening being defined at rearward ends of the first and second cargo walls;

a first accessory attachment track and a second accessory attachment track that are attached to the bed floor at spaced apart locations, each of the first and second accessory attachment tracks extending in a vehicle longitudinal direction;

a tailgate having a first end pivotally attached to a rear of the vehicle cargo area for pivoting movement between a closed position covering the tailgate opening between the first side cargo wall and the second side cargo wall and an open position exposing the tailgate opening, with a gap being defined between a rear end of the bed floor and the first end of the tailgate; and a tailgate gap cover having a first attachment structure releasably attached to the first accessory attachment track structure, a second attachment structure releasably attached to the second accessory attachment track structure, and a biasing structure that extends between the first attachment structure and the second attachment structure, the first attachment structure including a first bracket fixedly attached to the tailgate gap cover and a second bracket attached to the bed floor, the second bracket being attached to the first bracket for pivoting movement about a first pivot pin, and the second attachment structure including a third bracket fixedly attached to the tailgate gay cover and a fourth bracket releasably attached to the bed floor, the fourth bracket being attached to the third bracket for pivoting movement about a second pivot pin.

10. The vehicle cargo bed structure according to claim 9, wherein the biasing structure includes a torsion bar having a first end installed to the first attachment structure and a second end attached to the second attachment structure.

11. The vehicle cargo bed structure according to claim 10, wherein the first end of the torsion bar is restrained by the first bracket of the first attachment structure and the second end of the torsion bar is restrained by the fourth bracket of the second attachment structure.

12. The vehicle cargo bed structure according to claim 9, wherein each of the first and second accessory track has a pair of side walls defining a channel therebetween and a pair of lip portions that extend from upper ends of respective ones of the side walls defining an opening therebetween open to the channel, and each of the first attachment structure and the second attachment structure includes a first part and a second part, the first part being inserted into a corresponding one of the channels between the side walls and the second part being positioned above the pair of lip portions of the accessory attachment track with a fastening member extending between the first part and the second part clamping a corresponding one of the first and second attachment structures to the lip portions of corresponding one of the first and second accessory attachment track.

13. The vehicle cargo bed structure according to claim 9, wherein the tailgate gap cover includes a main portion having a plurality of stiffening ribs that extend parallel to the attachment structure.

14. The vehicle cargo bed structure according to claim 13, wherein the main portion of the tailgate gap cover includes an upper surface and a lower surface with the lower surface including a plurality of resilient members positioned to contact the tailgate.

15. The vehicle cargo bed structure according to claim 14, wherein the bed floor of the vehicle cargo area includes a plurality of ribs with recesses defined therebetween, and the lower surface of the main portion includes a forward end having a plurality of downwardly extending projections that extend into the recesses of the bed floor with the tailgate gap cover in the horizontal orientation.

* * * * *